(12) United States Patent
Kobayashi

(10) Patent No.: US 7,306,218 B2
(45) Date of Patent: Dec. 11, 2007

(54) DOCUMENT TRANSPORT APPARATUS AND DOCUMENT TRANSPORT METHOD, AND IMAGE READING APPARATUS

(75) Inventor: Atsumi Kobayashi, Yamanashi-ken (JP)

(73) Assignee: Nisca Corporation, Minamikoma-Gun, Yamanashi-Ken (JP)

( * ) Notice: Subject to any disclaimer, the term of this patent is extended or adjusted under 35 U.S.C. 154(b) by 82 days.

(21) Appl. No.: 10/798,300

(22) Filed: Mar. 12, 2004

(65) Prior Publication Data

US 2004/0188913 A1 Sep. 30, 2004

(30) Foreign Application Priority Data

Mar. 31, 2003 (JP) ............................. 2003-096521

(51) Int. Cl.
*B65H 29/00* (2006.01)
(52) U.S. Cl. .................... 271/186; 271/3.14; 271/4.01; 271/4.08; 271/65; 399/374
(58) Field of Classification Search ............... 271/3.14, 271/4.01, 4.08, 65, 186; 399/374
See application file for complete search history.

(56) References Cited

U.S. PATENT DOCUMENTS

| 4,817,933 | A | * | 4/1989 | Honjo et al. ................ 271/3.04 |
| 4,884,794 | A | * | 12/1989 | Dinatale et al. ............ 271/3.19 |
| 4,935,775 | A | * | 6/1990 | Ueda et al. .................. 399/183 |
| 5,216,474 | A | * | 6/1993 | Nakao ......................... 399/402 |
| 5,511,771 | A | * | 4/1996 | Rubscha .................... 271/4.01 |
| 5,754,934 | A | * | 5/1998 | Kamezaki et al. .......... 399/373 |
| 5,871,208 | A | * | 2/1999 | Hirai et al. ................. 271/3.01 |
| 6,125,251 | A | * | 9/2000 | Shiraishi et al. ............ 399/124 |
| 6,209,861 | B1 | * | 4/2001 | Kakuta et al. ............. 271/3.02 |
| 6,285,852 | B1 | * | 9/2001 | Etoh et al. .................. 399/367 |
| 6,467,767 | B2 | * | 10/2002 | Yano .......................... 271/122 |

(Continued)

FOREIGN PATENT DOCUMENTS

JP 02305756 A * 12/1990

(Continued)

OTHER PUBLICATIONS

Patent Abstracts of Japan, Publication No. 09-292742, Publication Date: Nov. 11, 1997, applicant: Ricoh Co., Ltd.

(Continued)

*Primary Examiner*—Gene O. Crawford
*Assistant Examiner*—Leslie A Nicholson, III
(74) *Attorney, Agent, or Firm*—Manabu Kanesaka

(57) ABSTRACT

A document transport apparatus includes a sheet feeding device for feeding a document from a sheet feeding tray; a transport device for receiving the document from the sheet feeding device and transporting the document to a predetermined position on a platen of an image reading apparatus; a sheet discharging device for discharging the document to a sheet discharging tray; a switch back path for turning the document upside down and reversing a front end and a rear end thereof, and for subsequently guiding the document to the sheet discharging device; and sheet discharging path for turning the document upside down, and subsequently guiding the document to the sheet discharging device. A control device controls such that the document is transported to the switch back path and returned from the switch back path to the platen via the sheet discharging path.

11 Claims, 12 Drawing Sheets

U.S. PATENT DOCUMENTS 6,601,842 B2 * 8/2003 Kobayashi et al. ........ 271/3.14
2001/0048830 A1 * 12/2001 Nose et al. ................ 399/374
2003/0047860 A1 * 3/2003 Takamatsu ................ 271/3.14

FOREIGN PATENT DOCUMENTS

| JP | 09292742 A | * 11/1997 |
| JP | 3329852 | 7/2002 |

OTHER PUBLICATIONS

Patent Abstracts of Japan, Publication No. 2002-362778, Publication Date: Dec. 18, 2002, Applicant: Nisca Corp.

* cited by examiner

Fig. 11(a)
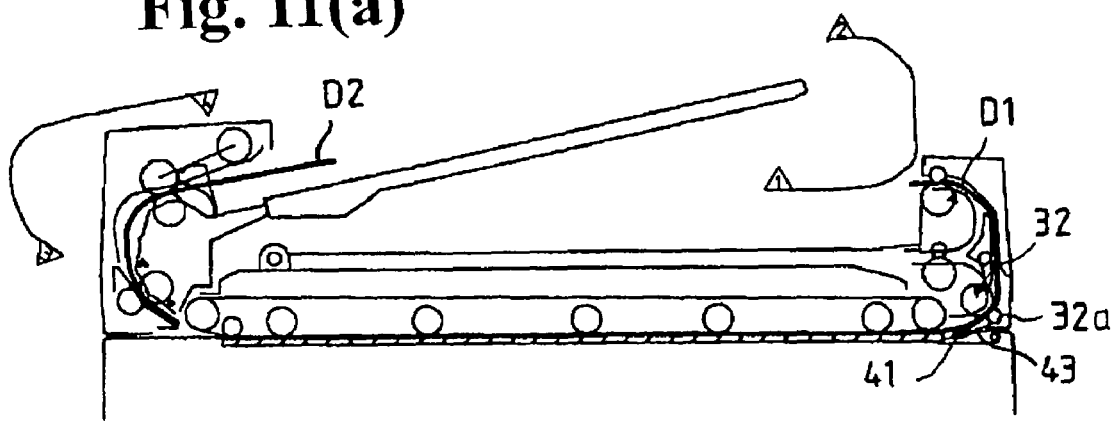
Fig. 11(b)
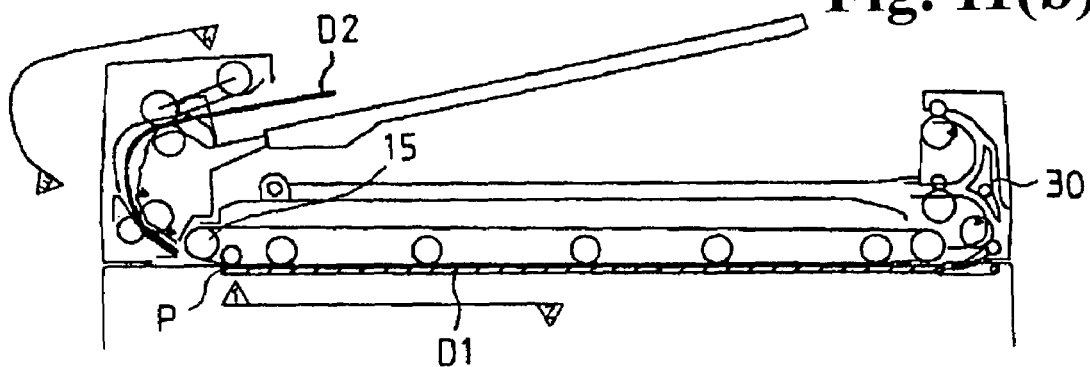
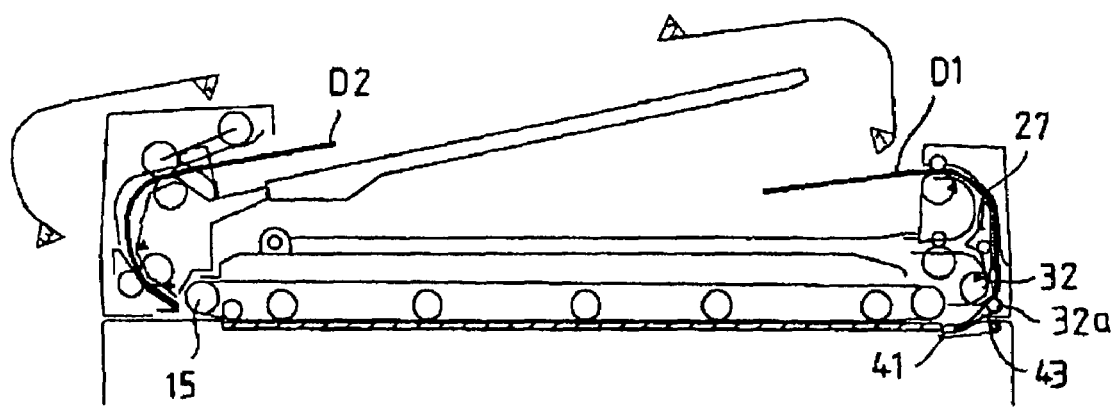
Fig. 11(c)

DOCUMENT TRANSPORT APPARATUS AND DOCUMENT TRANSPORT METHOD, AND IMAGE READING APPARATUS

BACKGROUND OF THE INVENTION AND RELATED ART STATEMENT

The present invention relates to an image reading apparatus such as a facsimile machine or a scanner, a document transport apparatus for feeding a document (sheet such as paper or a film sheet) into an image reading section of the image reading apparatus and for discharging the document after an image is read, and a document transport method.

In general, an image reading apparatus includes a document transport apparatus for transporting a document to an image reading section. The document transport apparatus may be a device separate from the image reading apparatus and can be installed on the image reading apparatus. Such a document transport apparatus generally transports the uppermost document stacked on a sheet feeding tray one by one and sequentially feeds and sets the sheet at a reading position of the image reading section. The document transport apparatus is configured to feed the document to the reading position after one side of the document is read, so that both sides of the document are read.

Japanese Patent Publication (Kokai) No. 2002-362778 and Japanese Patent No. 3329852 have disclosed a document transport apparatus in which a document is turned upside down as well as reversed front to back after the document is read in a one-side processing or a both-side processing, so that an order of the documents is maintained same as that on the sheet feeding tray when the document is discharged.

In the document transport apparatus disclosed in Japanese Patent Publication (Kokai) No. 2002-362778, a curved return path is provided at a discharge side for reading both sides of the document, and a roller path with a large-diameter roller is provided for guiding the document to the return path. After a front side of the document is read, the document passes through the roller path and the return path to be turned upside down, and returns to a reading section. In the document transport apparatus disclosed in Japanese Patent No. 3329852, a loop-shaped turning section is provided on a sheet feeding side. After a front side of the document is read, the document returns to the sheet feeding side to be turned upside down in a large loop, and returns to a reading section.

In the document transport apparatuses described above, when only one side of the document is read, the document is turned upside down and switched back, and is turned upside down again, so that the document is discharged in an aligned state.

In the document transport apparatus disclosed in Japanese Patent Publication (Kokai) No. 2002-362778, the larger-diameter roller is provided at an upstream side of the reading section for turning the document upside down and returning the document to the reading section. Accordingly, the apparatus main body has a large length in a lateral direction (document transport direction). In the document transport apparatus disclosed in Japanese Patent No. 3329852, the loop-shaped turning section is provided for turning the document upside down before the document is transported to the sheet feeding side. Accordingly, similarly to the apparatus in Japanese Patent Publication (Kokai) No. 2002-362778, the apparatus main body has a large length in the lateral direction.

That is, in the conventional document transport apparatus, if only one side of the document is read and the document is discharged orderly, the whole apparatus does not need to have a large length in the lateral direction. However, if it is necessary to read both sides of the document, the conventional document transport apparatus inevitably has a large size.

In view of the problems described above, the present invention has been made, and an object of the present invention is to provide a document transport apparatus as well as a document transport method in which both sides of the document can be read and the document can be discharged in an original order. Further, the document transport apparatus has a short length in the lateral direction.

Another object of the present invention is to provide an image reading apparatus having such a document transport function.

Further objects and advantages of the invention will be apparent from the following description of the invention.

SUMMARY OF THE INVENTION

In order to accomplish the objects described above, according to the present invention, a document transport apparatus includes sheet feeding means for feeding a document from a sheet feeding tray; transport means for receiving the document from the sheet feeding means and transporting the document to a predetermined position on a platen of an image reading apparatus; sheet discharging means for discharging the document on the platen to a sheet discharging tray after an image is read; a switch back path for turning the document upside down and reversing a front end and a trailing end thereof after the image is read, for turning the document upside down again, and for subsequently guiding the document to the sheet discharging means; a sheet discharging path for turning the document upside down without reversing the front end and the trailing end thereof after the image is read, and for subsequently guiding the document to the sheet discharging means; and control means for transporting the document on the platen to the switch back path after one side of the document is read and then returning the document from the switch back path to the predetermined position on the platen via the sheet discharging path.

In the document transport apparatus described above, when one side of the document is processed, the image of the document is read on the platen, and the sheet discharging means discharges the document to the sheet feeding tray through the switch back path. After the image is read, the document is transported through the switch back path while being turned upside down twice. Accordingly, the document is discharged to the sheet discharging tray while a surface with the image faces downwardly, so that the document is discharged in an original order. When both sides of the document are processed, the document is guided to the switch back path after one side thereof is processed, and then transported to the platen through the sheet discharging path for turning the document upside down, so that the other side of the document can be read. After the other side of the document is read, the sheet discharging means discharges the document through the sheet discharging path for turning the document upside down. Therefore, the document is discharged to the sheet discharging tray while the surface with the image faces downwardly, so that the document is discharged in an original order.

According to the present invention, a document transport apparatus includes sheet feeding means for feeding a document from a sheet feeding tray; transport means for receiving the document from the sheet feeding means and transporting the document to a predetermined position on a platen of an image reading apparatus; a pair of sheet discharging rollers capable of rotating in forward and reverse directions for discharging the document on the platen to a sheet discharging tray after an image is read and for returning the document to the platen of the image reading apparatus after one side of the document is processed; a switch back path disposed between the platen and the pair of the sheet discharging rollers for turning the document upside down and reversing a front end and a trailing end thereof after the image is read, for turning the document upside down again, and for subsequently guiding the document to the sheet discharging means; and a sheet discharging path disposed between the platen and the pair of the sheet discharging rollers and branched from the switch back path for turning the document upside down without reversing the front end and the trailing end thereof after the image is read, and for discharging the document to the sheet discharging means.

In the document transport apparatus described above, when both sides of the document are processed, after one side of the document is processed, the document is turned upside down through the sheet discharging path and then guided to the switch back path. The document is then turned upside down twice through the switch back path and subsequently transported to the platen, so that the other side of the document can be read. After the other side of the document is read, the pair of sheet discharging rollers discharges the document again through the sheet discharging path for turning the document upside down. As a result, the document is discharged to the sheet discharging tray while the surface with the image faces downward, so that the document is discharged in an original state.

According to the present invention, in a process of transporting a document stacked on a sheet feeding tray to a predetermined reading position and transporting the document to a sheet discharging tray after an image is read, a document transport method includes a step of transporting the document on the sheet feeding tray with sheet feeding means; a step of receiving the document from the sheet feeding means and transporting the document to a predetermined position on the platen of an image reading apparatus; a step of turning the document upside down and reversing a front end and a trailing end thereof after the image is read at the predetermined position, and guiding the document to a switch back path for turning the document upside down again; a step of receiving the document from the switch back path and transporting the document to a sheet discharging stacker; a step of switching a transporting direction that the document is transported before the document is completely discharged to the sheet discharging stacker; a step of guiding the document to a U turn path after the transporting direction is switched, and then for returning the document to the predetermined position on the platen; and a step of transporting the document to the U turn path after the document is returned to the platen and discharging the document to the sheet discharging tray.

According to the present invention, in a process of transporting a document stacked on a sheet feeding tray to a predetermined reading position and transporting the document to a sheet discharging tray after an image is read, a document transport method includes a step of transporting the document on the sheet feeding tray with sheet feeding means; a step of receiving the document from the sheet feeding means and transporting the document to a predetermined position on the platen of an image reading apparatus; a step of guiding the document upside to a U turn path after the image is read at the predetermined position and transporting the document to the sheet discharging stacker; a step of switching a transporting direction that the document is transported before the document is completely discharged to the sheet discharging stacker; a step of turning the document upside down and reversing a front end and a trailing end thereof after the transporting direction is switched, and guiding the document to a switch back path for turning the document upside down again; a step of receiving the document from the switch back path and transporting the document to the predetermined position of the platen; and a step of transporting the document to the U turn path after the document is returned to the platen and discharging the document to the sheet discharging tray.

In the present invention, when both sides of the document are read, the document is switched back twice through the switch back path and the U turn path and then returned to the platen, thereby reducing a size of the switch back section.

According to the present invention, an image reading apparatus includes a platen for placing a document; reading means for reading an image of the document on the platen; sheet feeding means for feeding the document from a sheet feeding tray; transport means for receiving the document from the sheet feeding means and transporting the document to a predetermined position on a platen of an image reading apparatus; sheet discharging means for discharging the document on the platen to a sheet discharging tray after an image is read; a switch back path for turning the document upside down and reversing a front end and a trailing end thereof after the image is read, for turning the document upside down again, and for subsequently guiding the document to the sheet discharging means; a sheet discharging path for turning the document upside down without reversing the front end and the rear end thereof after the image is read, and for subsequently guiding the document to the sheet discharging means; and control means for transporting the document on the platen to the switch back path after one side of the document is read and then returning the document from the switch back path to the predetermined position on the platen via the sheet discharging path.

With the method described above, when the image reading apparatus reads the document, the steps of the document transport apparatus described above are carried out in the image reading apparatus.

BRIEF DESCRIPTION OF THE DRAWINGS

FIGS. 11(a), 11(b), and 11(c) are views sequentially illustrating the both-side reading operation No. 3.

DETAILED DESCRIPTION OF PREFERRED EMBODIMENTS

Figure 1:
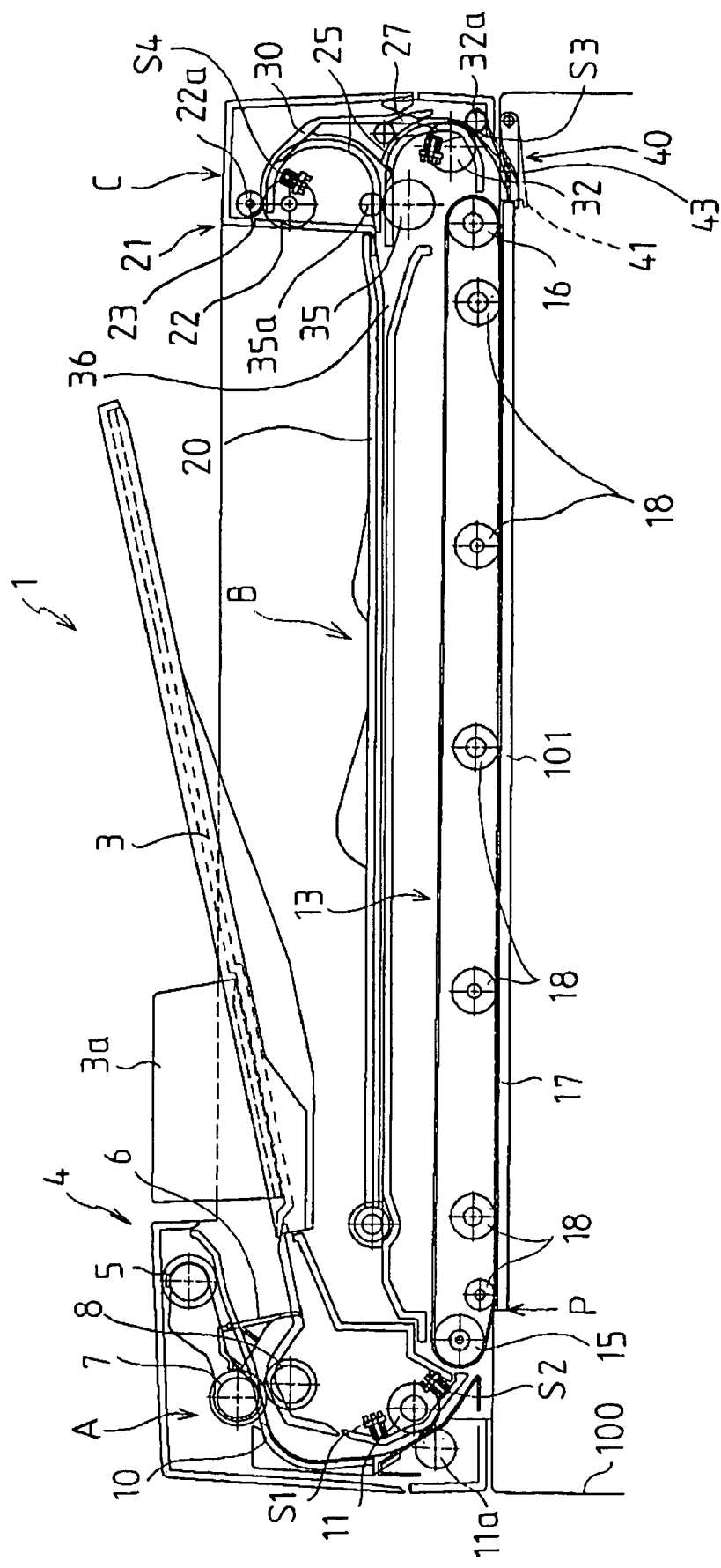
FIG. 1 is a schematic view showing a configuration of a document transport apparatus installed on an image processing apparatus.
Figure 2A:
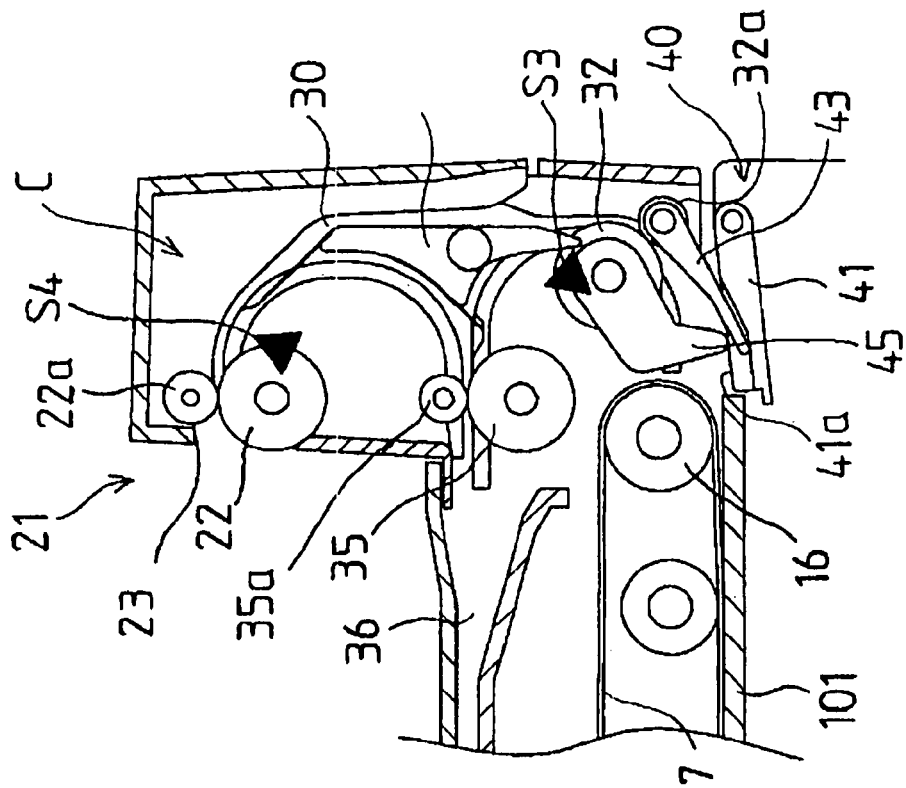
FIGS. 2(*a*) and 2(*b*) are views showing a configuration of switching means, wherein FIG. 2(*a*) is a view showing a state that a document is transported from a sheet discharging side to a platen, and FIG. 2(*b*) is a view showing a state that the document is guided from the platen to the sheet discharging side.
Figure 2B:
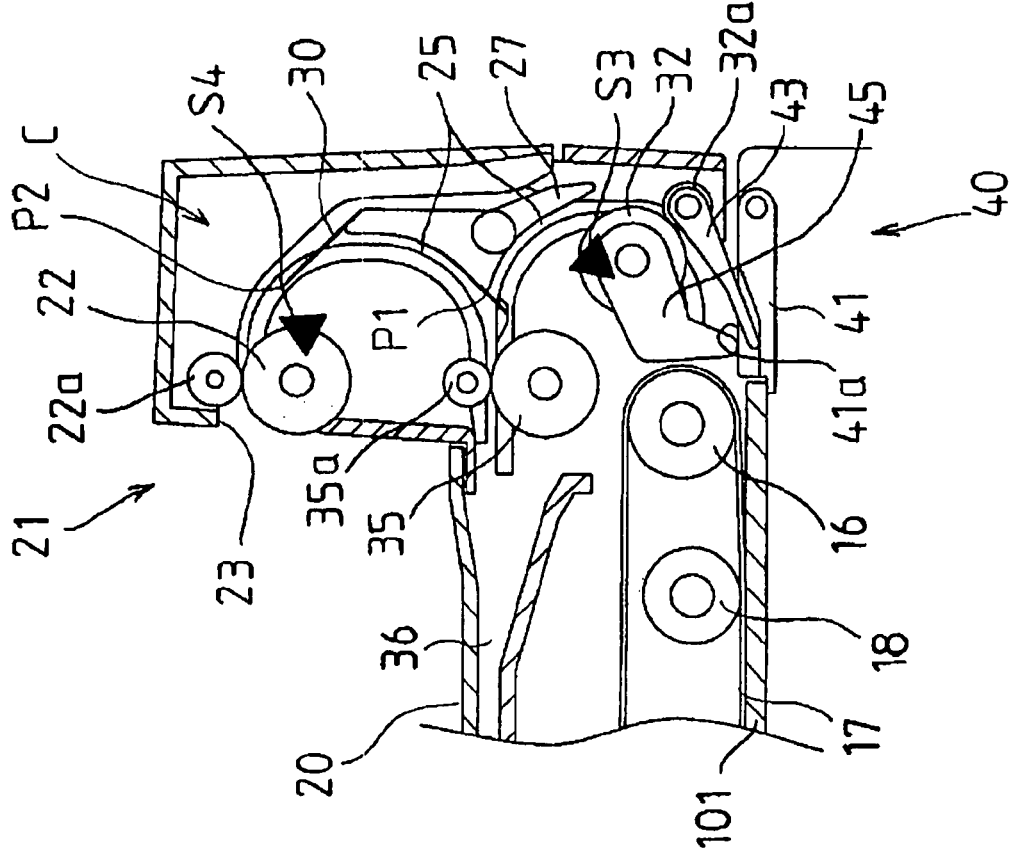

Hereunder, embodiments of the present invention will be explained with reference to the accompanying drawings. FIG. 1 is a side view showing an internal configuration of a document transport apparatus. FIGS. 2(a) and 2(b) are views showing a configuration of a switch back/sheet discharging section.

A document transport apparatus 1 according to the present embodiment is installed on a top surface of an image reading apparatus 100. The document transport apparatus 1 comprises a sheet feeding section A for feeding a document to a platen glass (hereinafter referred to as platen) 101, a transporting section B for transporting the document on the platen 101 so that a reading apparatus (not shown) disposed below the platen 101 reads an image on the document, and a switch back/sheet discharging section C for discharging and returning the document to the platen after the image is read.

A sheet feeding tray 3 and sheet feeding means 4 are provided on the top surface of the document transport apparatus 1. The document is stacked and accommodated on the sheet feeding tray 3 having a side guide 3a. The sheet feeding means 4 delivers the document stacked on the sheet feeding tray 3. The sheet feeding means 4 comprises a pickup roller 5 that lowers to abut against the document when an empty sensor (not shown) detects a state that the document is placed; a document stopper 6 that rotates to release a leading end of the document when the pickup roller 5 lowers; a feed roller 7 disposed at a downstream side of the document stopper 6 for separating the documents transported from the pickup roller 5 into a single document; and a separation roller 8 pressing the feed roller 7.

A transporting path 10 is formed in a curved shape and disposed at a downstream side of the sheet feeding means 4 for guiding the document to the platen 101 of the image reading apparatus 100. The transporting path 10 is provided with a sensor S1 for detecting the leading end of the document, a register roller 11 for nipping the document to transport, and a driven roller 11a pressing the register roller 11 in this order. With this configuration of the sheet feeding section, the document is sequentially stacked with face up and transported to the platen 101 so that an image thereon can be read.

The document delivered from the sheet feeding tray 3 is located at a document set reference position P on the platen 101 with the pair of register rollers 11 and 11a and transport means 13 disposed on the platen. The transport means 13 is disposed at both ends of the platen in a longitudinal direction. The transport means 13 comprises belt rollers 15 and 16 capable of rotating in forward and reverse directions (in the present embodiment, the belt roller 15 on the sheet feeding side provides driving, whereas the belt roller 16 follows the belt roller 15), an endless white belt 17 extending between the belt rollers, and pressure rollers 18 successively disposed inside the endless white belt for pressing the document against the platen glass. With this configuration of the transporting section, it is possible to move the document to the plate 101 when the endless white belt 17 rotates.

Sheet discharging means 21 is disposed at a downstream side of the platen 101 above the belt roller 16 for discharging the document to a sheet discharging tray 20. The sheet discharging means 21 comprises a sheet discharging roller 22 and a driven roller 22a pressing the sheet discharging roller 22. The pair of sheet discharging rollers 22 and 22a is driven to rotate in the forward direction to discharge the document to the sheet discharging tray 20 via a sheet discharging port 23. In a both-side reading mode, the sheet discharging rollers 22 and 22a are driven to rotate in the reverse direction so as to return the document to the platen after one side thereof is read, i.e. the sheet discharging rollers 22 and 22a have a switch back function.

A switch back path 25 is disposed between the platen 101 and the sheet discharging means for turning the document upside down and reversing the leading end to a trailing end thereof after the image is read, for turning the document upside down again, and for subsequently guiding the document to the sheet discharging means. A switching flapper 27 is disposed at an upstream side of the switch back circuit 25 and is driven to rotate by a gate flapper solenoid (not shown). A sheet discharging path (U turn path) 30 is branched from the switching flapper 27. When the sheet discharging path 30 is selected via the switching flapper 27, the document is guided to the sheet discharging means 21 after the document is turned upside down without being reversed the leading end to the trailing end thereof.

In the switch back path 25, a scooping roller 32 and a driven roller 32a pressing the scooping roller 32 are disposed at an upstream side of the switching flapper 27 for scooping up the document after the image is read and guiding the document to the switch back path 25 or the sheet discharging path 30 through a distributing operation of the switching flapper 27. In this case, the scooping roller 32 is capable of rotating in the forward and reverse directions for guiding the document to the sheet discharging means 21 or the platen 101 after the image is read. A sensor S3 is disposed at a downstream side of the pair of scooping rollers 32 and 32a for detecting the trailing end of the document.

In the switch back path 25, a switch back roller 35 and a driven roller 35a pressing the switch back roller 35 are disposed at a position where the document is turned upside after the image is read. After the image is read, the switch back rollers 35 and 35a guide the document turned upside down to a gap 36 between the sheet discharging tray 20 and the transporting section B. Subsequently, the switch back rollers 35 and 35a are driven to rotate in the reverse direction to reverse the leading end of the document to the trailing end, and transport the document to the sheet discharging means 21.

A downstream part of the sheet discharging path 30 is connected to a downstream part of the switch back path 25. After the pair of switch back rollers 35 and 35a reverses and transports the document in the reverse direction, the document passes through the connecting portion while the document is turned upside down again. The document is then guided to the sheet discharging means 21 (sheet discharging rollers 22 and 22a). A sensor S4 is disposed in front of the pair of sheet discharging rollers 22 and 22a for detecting the trailing end of the document.

As shown in FIG. 2(a), flexible films (not shown) are disposed at a substantially intermediate position P1 of the switch pack path 25 and at a position P2 where the switch back path 25 is connected to the sheet discharging path 30, so that the document is not guided to the path through which the document is transported when the pair of switch back rollers 35 and 35a and the pair of sheet discharging rollers 22 and 22a cooperatively switch back the document.

Furthermore, switching means 40 is disposed between a trailing end of the platen and the pair of scooping rollers 32 and 32a, so that the document is smoothly guided to the switch back path 25 after the image is read on the platen, and conversely, the document returned from the sheet discharging path 30 is smoothly guided to the platen 101.

Figure 3:
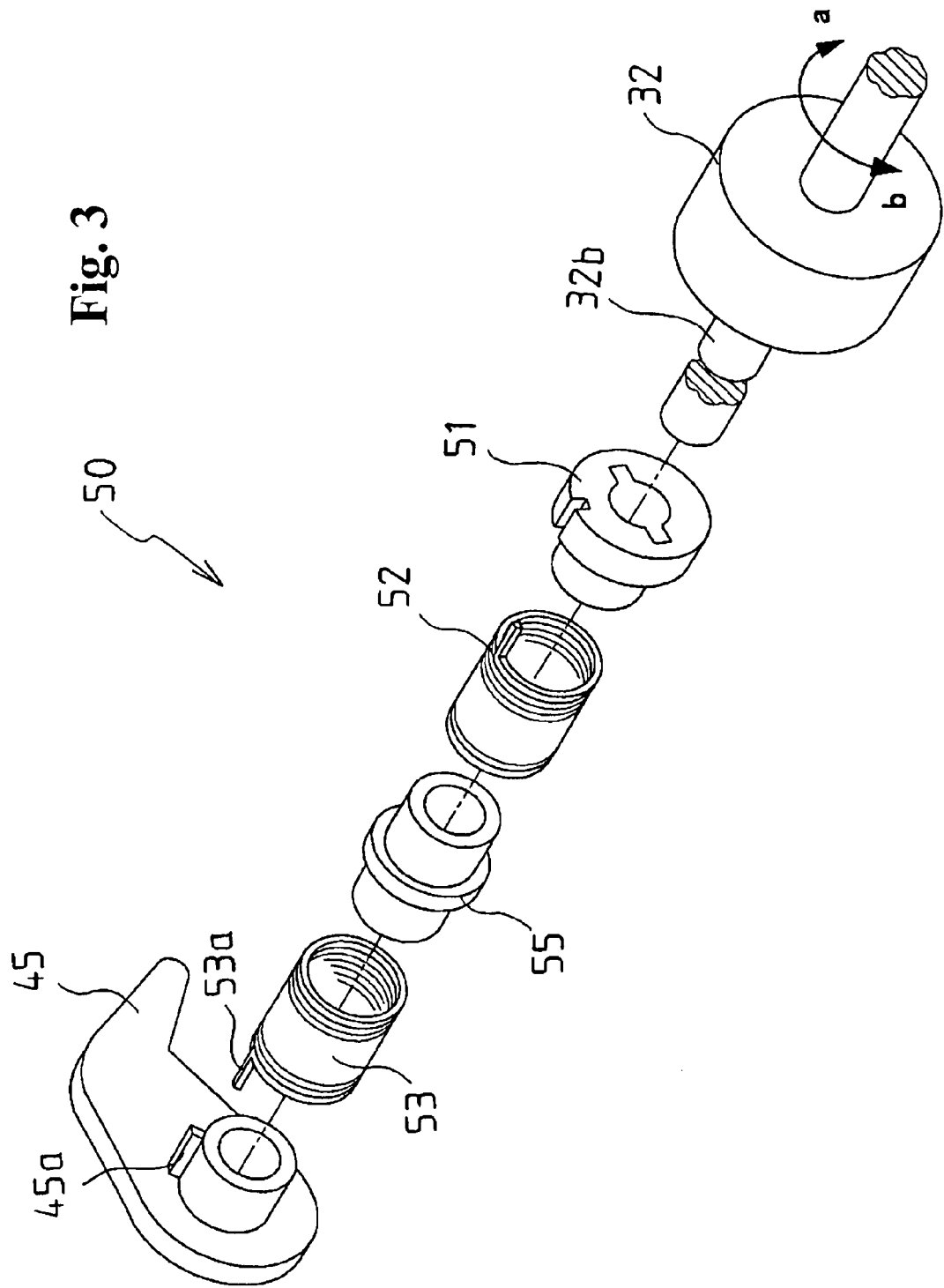
FIG. 3 is a view showing a configuration of a torque limiter disposed in a driving portion of a driving lever in the switching means.

A configuration of the switching means 40 will be described with reference to FIGS. 1 to 3. The switching means 40 comprises a movable guide 41 rotatably supported on the top surface of the image reading apparatus 100 at a downstream side of the platen and extending in a width direction of the platen (width direction of the document). The movable guide 41 is always urged clockwise and abuts against a stopper (not shown) so as to be held in the position shown in FIG. 2(a). At this time, a surface 41a of the movable guide 41 is set to be above a surface of the platen 101.

A scooping guide 43 supported coaxially with the driven roller 32a of the pair of scooping rollers is fitted in the movable guide 41 in a comb tooth manner. The scooping guide 43 is always urged in a direction to abut against the movable guide and follow a rotational movement of the movable guide 41. The scooping guide 43 has a function of guiding the document smoothly to the platen 101 in the position shown in FIG. 2(a) and to the switch back path 25 or the sheet discharging path 30 in the position shown in FIG. 2(b).

A driving lever 45 is provided on a driving shaft 32b of the scooping roller 32 and engages the movable guide 41. The driving lever 45 moves the movable guide 41 to rotate as shown in FIGS. 2(a) and 2(b). In this case, the driving lever 45 is driven via a torque limiter 50 disposed between the driving lever 45 and the driving shaft 32b. The torque limiter 50 comprises a driving input arbor 51 fittingly clamped to the driving shaft 32b; a driving lever downward moving spring 52 engaging the driving input arbor 51; a driving lever upwardly moving spring 53 including an engaging portion 53a engaging an engaging portion 45a formed on the driving lever 45; and a joint 55 disposed between the upper moving spring and the lower moving spring.

With the configuration described above, when the scooping roller 32 is driven to rotate in a direction that the document is drawn from the platen (arrow direction a in FIG. 3), the driving input arbor 51 rotates with the scooping roller 32. This rotational driving force is transmitted to the driving lever downward moving spring 52 and then to the driving lever upwardly moving spring 53 due to a tightening force exerted between the driving lever downward moving spring 52 and the joint 55. At this time, the driving lever upwardly moving spring 53 transmits the rotational driving force to the driving lever 45 via the engaging portion 53a and the engaging portion 45a because of a slip torque.

While the scooping roller 32 is driven to rotate in the arrow direction a, the driving lever 45 urges the movable guide 41 so as to rotate counterclockwise from the initial position shown in FIG. 2(a), as shown in FIG. 2(b). In contrast, when the scooping roller 32 is driven to rotate in a direction that the document is returned to the platen (arrow direction b in the FIG. 3), the driving input arbor 51 rotates with the scooping roller 32. This rotational driving force is transmitted to the driving lever upwardly moving spring 53 due to a tightening force exerted between the driving lever upwardly moving spring 53 and the joint 55. On the opposite side, the engaging portion 53a and the engaging portion 45a engage with each other. At this time, the rotational driving force is transmitted to the driving lever 45 due to the slip torque of the driving lever downward moving spring 52. While the scooping roller 32 is driven to rotate in the arrow direction b, the driving lever 45 rotates to the position shown in FIG. 2(a) to place the movable guide 41 at the initial position.

Thus, the movable guide 41 and the scooping guide 43 are switched between the state shown in FIG. 2(a) and the state shown in FIG. 2(b). Consequently, the document is delivered between the transporting section B and the switch back/sheet discharging section C.

Figure 4:
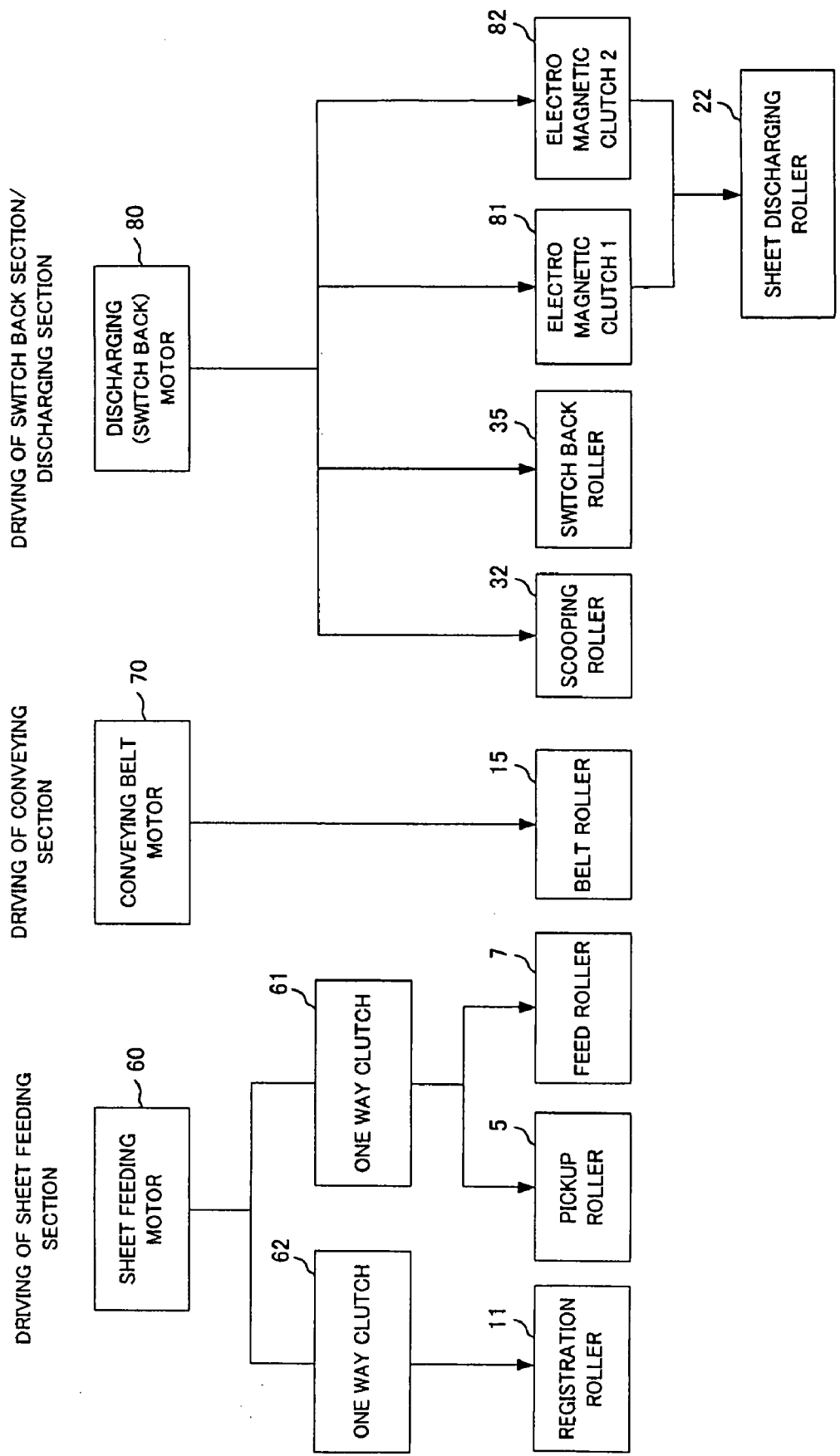
FIG. 4 is a block diagram explaining driving systems of a sheet feeding section, a transporting section, and a switch back/sheet discharging section in the document transport apparatus.
Figure 5:
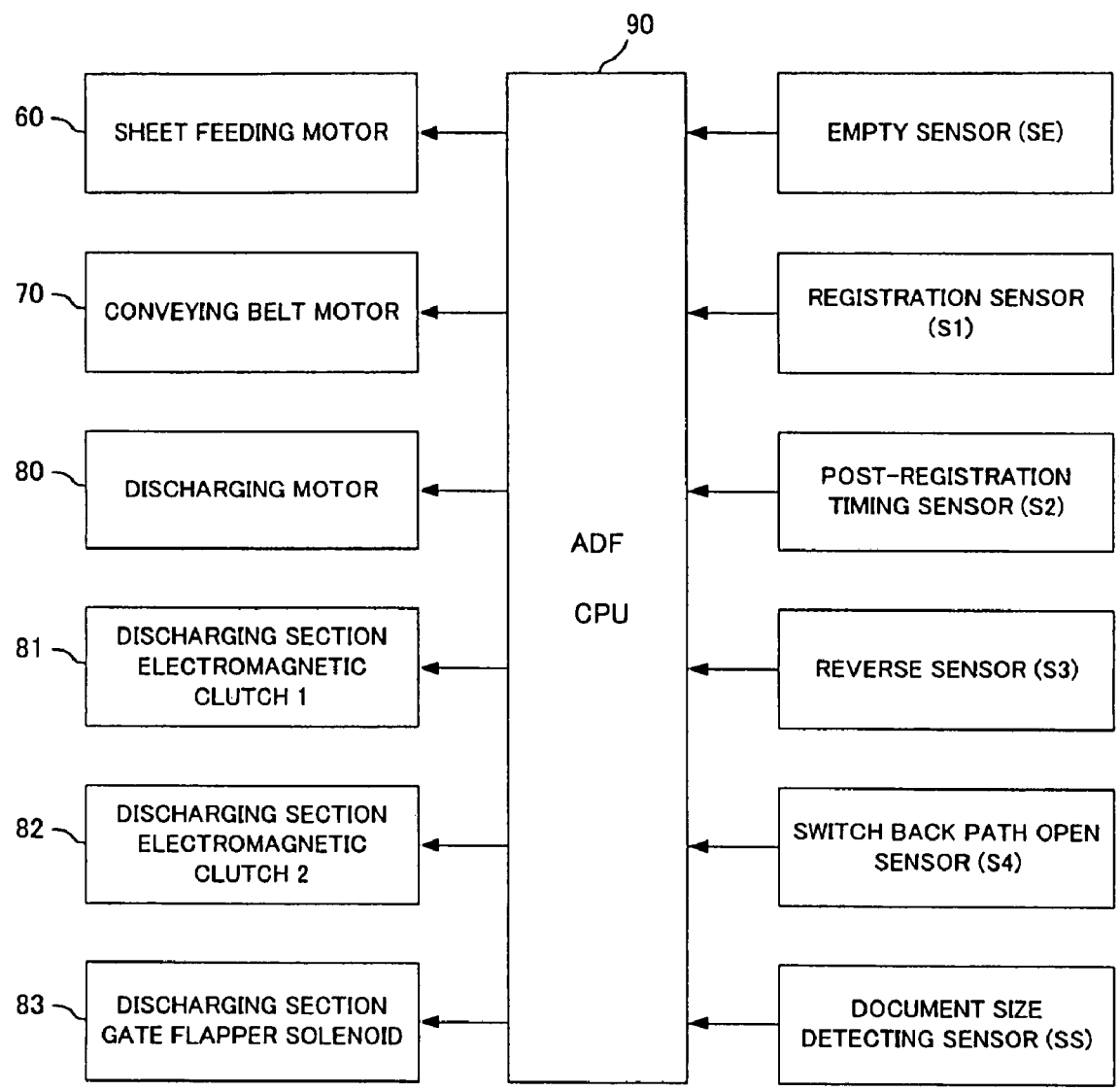
FIG. 5 is a block diagram explaining drive control in the document transport apparatus.

With reference to the block diagrams in FIGS. 4 and 5, configurations of driving systems for the sheet feeding section A, transporting section B, and switch back/sheet discharging section C will be explained.

In the configuration of the present embodiment, the sheet feeding section A, the transporting section B, and the switch back/sheet discharging section C are driven by their own driving sources, i.e. a sheet feeding motor 60, a transporting belt motor 70, and a discharging motor (switch back motor) 80. In this case, the pickup roller 5 and the feed roller 7 are connected to the sheet feeding motor 60 via a one way clutch 61 that transmits only forward driving provided by the sheet driving motor 60. The register roller 11 is connected to the sheet feeding motor 60 via a one-way clutch 62 that transmits only reverse driving provided by the sheet driving motor 60.

The transporting belt motor 70 drives the belt roller 15 to rotate the endless white belt 17 on the platen. In this case, the transporting belt motor 70 is driven to rotate in the forward or reverse direction to transport the document from the platen to the switch back path 25 or from the switch back path 25 to the platen.

The scooping roller 32 and the switch back roller 35 rotate synchronously with the switch back motor in the forward or reverse direction. The sheet discharging roller 22 is connected to the switch back motor 80 via an electromagnetic clutches 81 and 82. A direction that the sheet discharging roller 22 rotates can be selected by turning on or off each of the two electromagnetic clutches, regardless of a direction that the switch back motor 80 rotates. The switch back/sheet discharging section C may be driven using a plurality of driving motors. The form of driving may be properly varied; for example, a first driving motor may be used to exclusively drive the scooping roller 32, while a second driving motor may be used to exclusively drive the switch back roller 35 and the sheet discharging roller 22.

Control means (CPU) 90 installed in the apparatus main body controls the forward/reverse rotational driving of each of the sheet feeding motor 60, transporting belt motor 70, and switch back motor 80 as well as timings for the driving. In this case, the CPU 90 receives various detection signals (signals of the presence of the document, a passage state, and a document size) from the empty sensor SE, sensors S1 to S4, a sensor S5 that detects the size of the document. On the basis of these detection signals, the CPU 90 controls the motors 60, 70, and 80. The CPU also controls the electromagnetic clutches 81 and 82 and the discharging section gate flapper solenoid 83 for driving the switching flapper 27 according to the detection signals from the sensors.

Figure 7A:
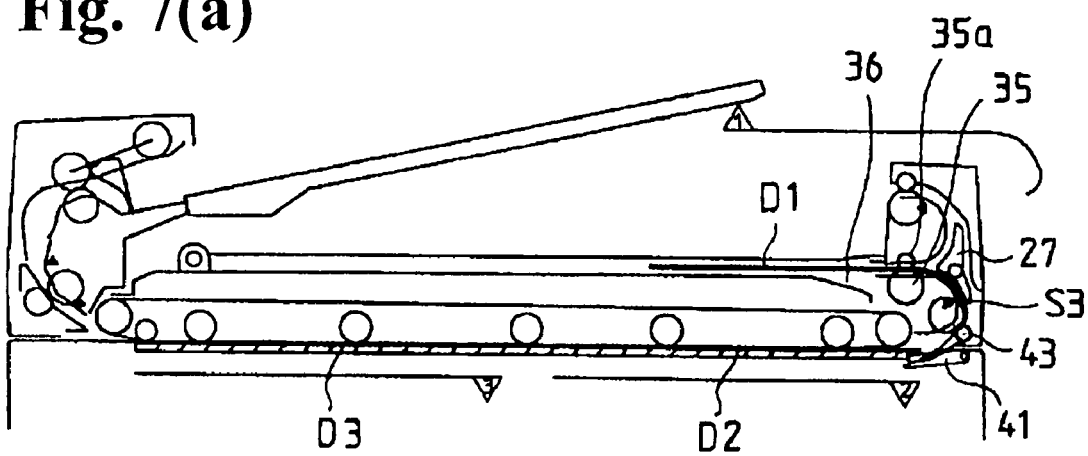
FIGS. 7(a), 7(b), and 7(c) are views sequentially illustrating the one-side reading operation No. 2.
Figure 7B:
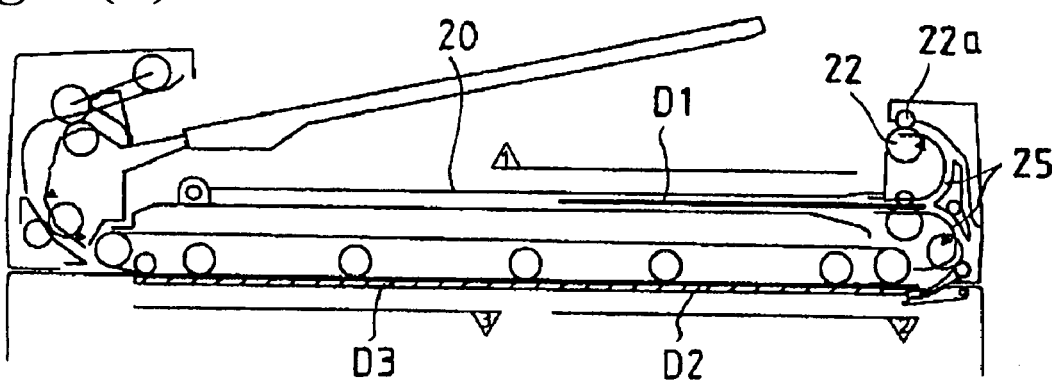
Figure 7C:
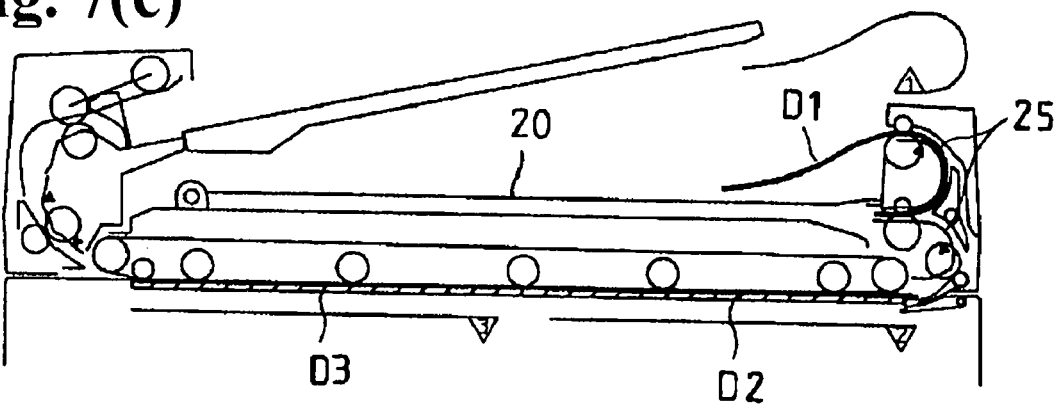
Figure 8:
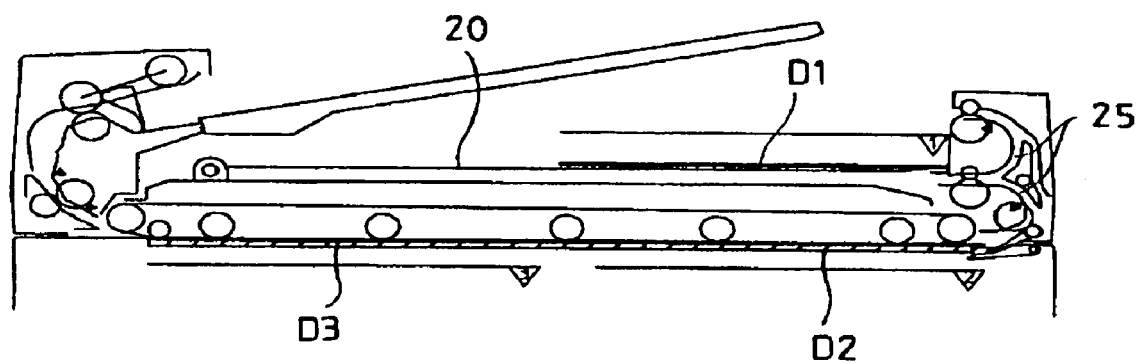
FIG. 8 is a view illustrating the one-side reading operation No. 3.

An operation of the document transport apparatus will be explained with reference to FIGS. 1 to 3 and FIGS. 6 to 12. FIGS. 6 to 8 sequentially show operations performed in a one-side reading mode. FIGS. 9 to 12 sequentially show operations performed in a both-side reading mode.

When the documents are stacked and set on the sheet feeding tray 3 (three documents D1 to D3 were stacked) with image sides upwardly, the empty sensor detects the documents. Upon the detection, the pickup roller is driven downwardly and the document stopper 6 rotates clockwise. The sheet feeding motor is driven in the forward direction to rotate the pickup roller 5 to start feeding the documents. The first fed document D1 is separated by the separation roller, pressed by the feed roller 7, and guided to a nip portion between the pair of register rollers 11 and 11a in an idle state due to the one-way clutch. At this time, at a specified timing after the sensor S1 detects the leading end of the document, the pickup roller 5 and feed roller 7 are stopped. A loop is formed at the nip portion and the document is registered.

After the document is registered, the sheet feeding motor is driven to rotate in the reverse direction to rotate the register roller 11 in a direction that the document is transported. The pickup roller 5 and the feed roller 7 are rotated in unison with the one-way clutch. As soon as the register roller 11 starts to rotate, the transporting belt motor drives the belt roller 15 to rotate. The endless white belt 17 is driven to rotate in the document transporting direction. Then, the sensor S2 detects the trailing end of the document D1. A specified time later, the rotational driving of the belt roller 15 is stopped. At this time, the document D1 is placed at the document set reference position P with the read surface facing the platen (see FIGS. 6(a) and 6(b)).

In this state, the document D1 is read, and the next document D2 is delivered and registered using a procedure similar to that described above. Subsequently, at the position where the sensor S2 detects the leading end of the document D2, the sheet feeding motor is stopped. The document D2 then waits to be fed to the platen (see FIG. 6(b)).

According to a completely read signal of the document D1, the belt roller rotates to transport the document D1 toward a downstream side. At the same time, the sheet feeding motor is driven to rotate in the reverse direction to drive the register roller 11. Thus, the document D2 standing by at the position of the sensor S2 is fed onto the platen. Then, the trailing end of the document D2 passes by the sensor S2. A specified time later, the rotational driving of the belt roller 15 is stopped. The document D2 is thus placed at the set reference position P. When the trailing end of the document D2 passes by the sensor S2, the sheet feeding motor is driven to rotate in the forward direction. According to a procedure similar to that described above, the next document D3 stands by at the position of the sensor S2 (see FIG. 6(c)). At this time, the document D2 placed at the set reference position P is read.

On the other hand, once the document D1 is completely read, the switch back motor is driven to rotate in the forward direction. The scooping roller 32 and the switch back roller 35 are driven to rotate in the document feeding direction. The scooping roller 32 is driven to rotate in the arrow direction a in FIG. 3 to smoothly guide the document D1 transported by the endless white belt 17 to the switch back path via the movable guide 41 and the scooping guide 43 positioned as shown in FIG. 2(b). At this time, the switching flapper 27 is rotated so as to open the switch back path.

The leading end of the document D1 is further fed via the pair of switch back rollers 35 and 35a and then guided to the gap 36 below the sheet discharging tray 20. Furthermore, during this operation, the document D3 standing by at the position of the sensor S2 is placed at the set reference position P. The document D2 is positioned in front of the movable guide 41 and the scooping guide 43 (see FIG. 7(a)).

The sensor S3 detects the trailing end of the document D1 passing through the gap 36 (through the flexible film installed at the position P1). A specified time later, the switch back motor is driven to rotate in the reverse direction to convey the document D1 to the pair of sheet discharging rollers 22 and 22a along the switch back path (see FIGS. 7(b) and 7(c)). Then, the document D1 is discharged onto the sheet discharging tray 20 via the pair of sheet discharging rollers 22 and 22a rotating in a sheet discharging direction (see FIG. 8).

The switch back path sets the document D1 so that the image side faces downward during discharging. The procedure shown in FIGS. 7(a) to 8 is repeated to discharge the succeeding documents D2, D3, . . . onto the sheet discharging tray so that their image sides face downward. As a result, the documents stacked on the sheet feeding tray 3 with their image sides face upwardly are sequentially discharged onto the sheet discharging tray 20 after image reading, so that their image sides face downward, thereby maintaining the original order of the documents.

The above process procedure reduces the time required for image reading in successively reading documents, while allowing the documents to be discharged in the original order.

Figure 6A:
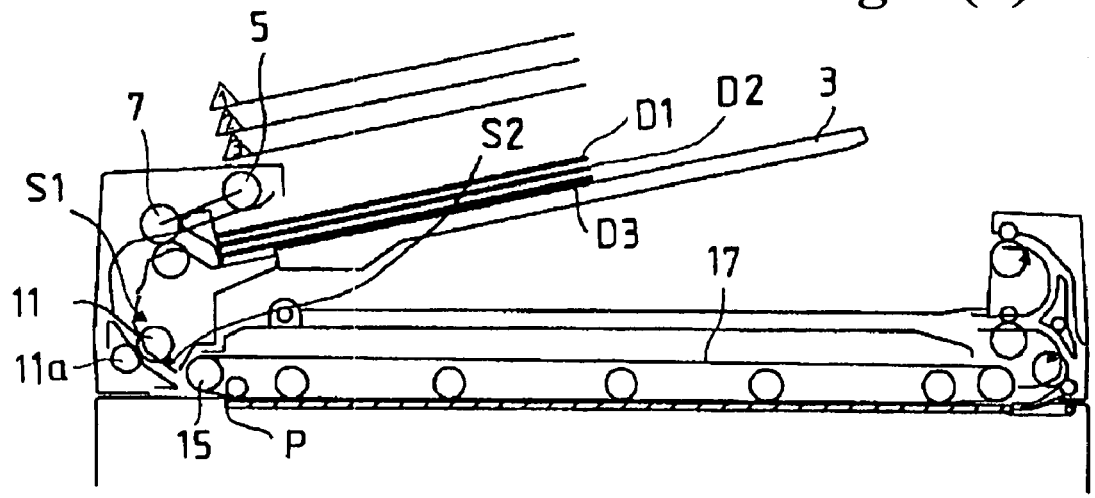
FIGS. 6(*a*), 6(*b*), and 6(*c*) are views sequentially illustrating a one-side reading operation No. 1.
Figure 6B:
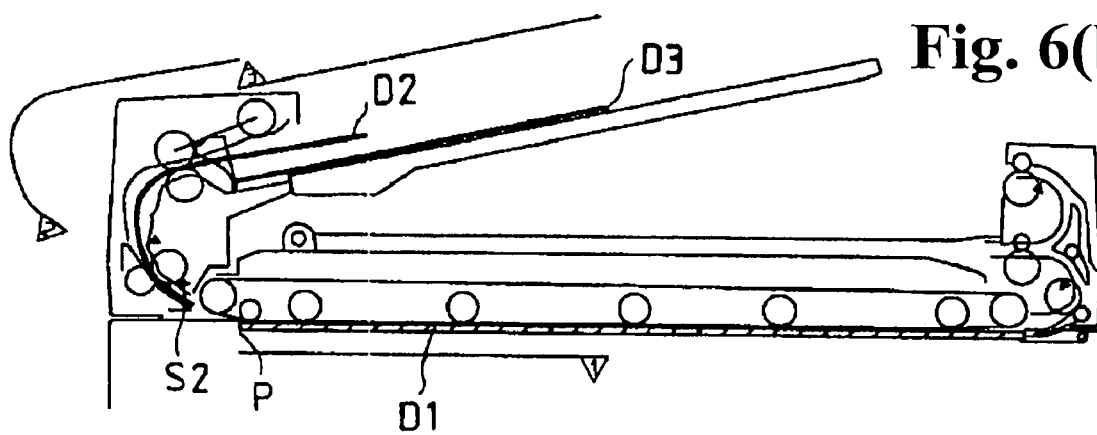
Figure 6C:
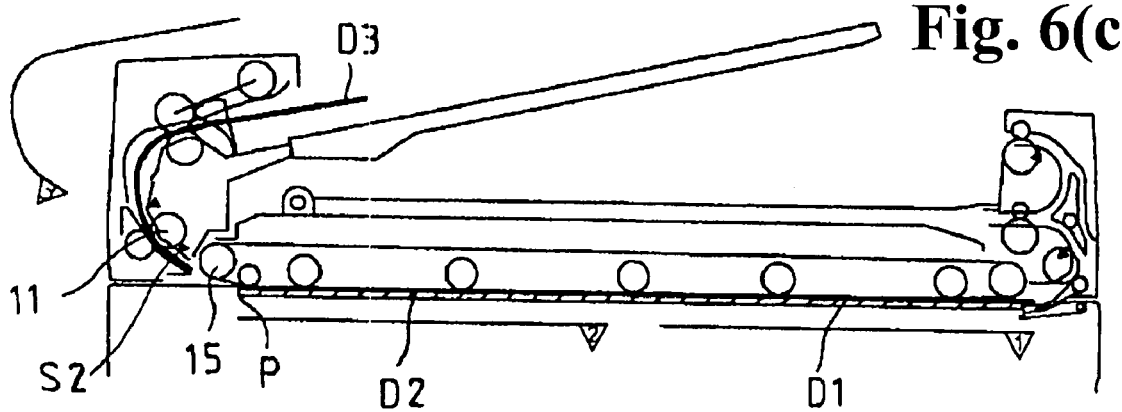
Figure 9A:
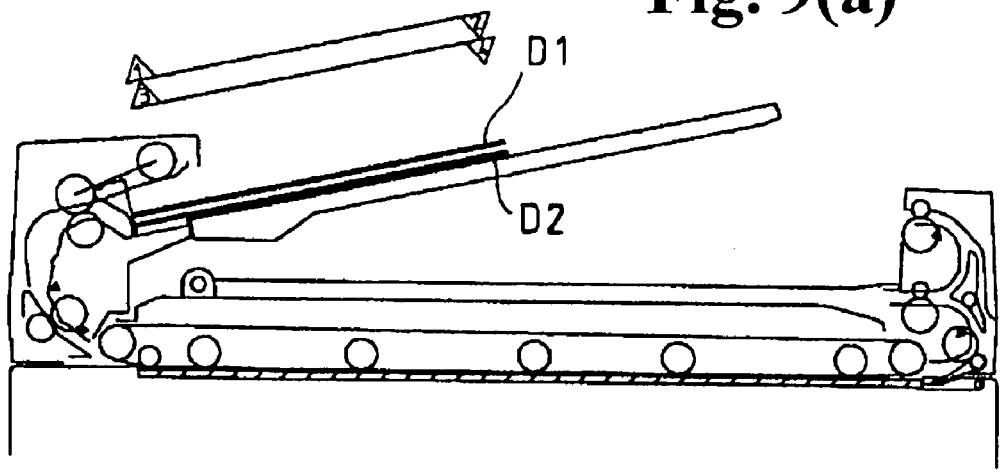
FIGS. 9(a), 9(b), and 9(c) are views sequentially illustrating a both-side reading operation No. 1.
Figure 9B:
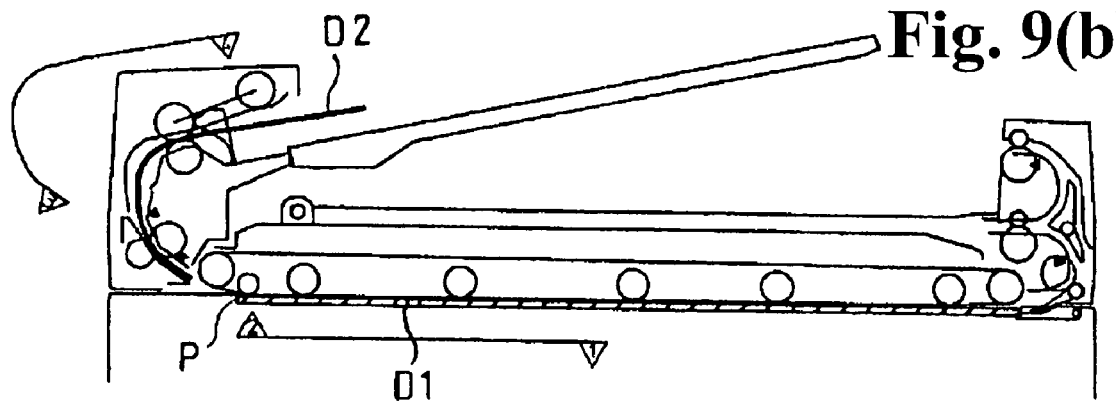
Figure 9C:
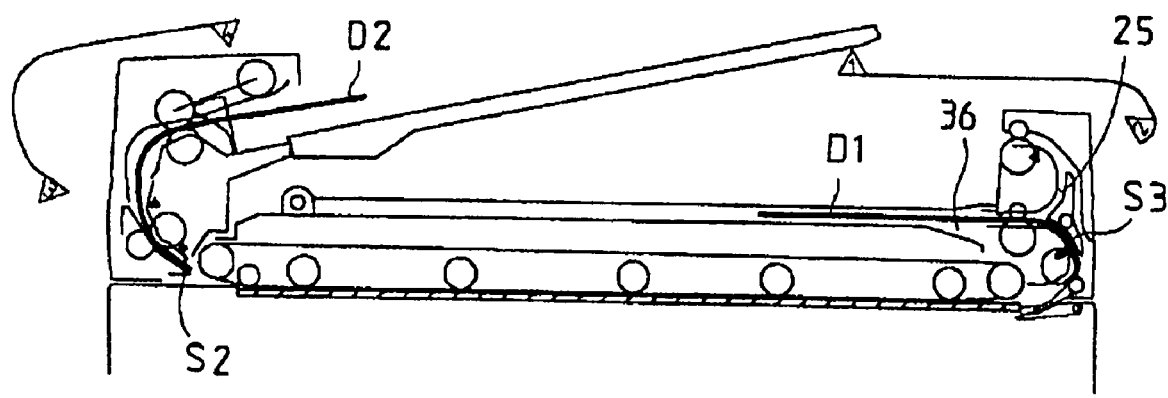
Figure 10A:
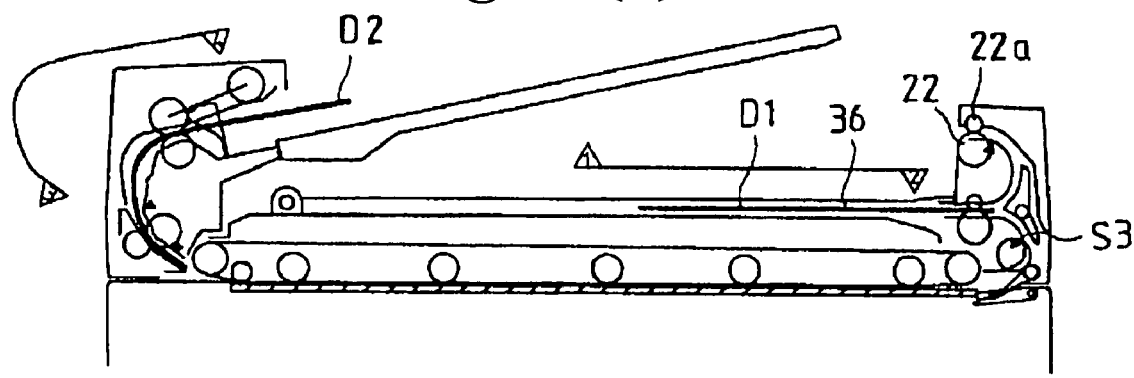
FIGS. 10(a), 10(b), and 10(c) are views sequentially illustrating the both-side reading operation No. 2.
Figure 10B:
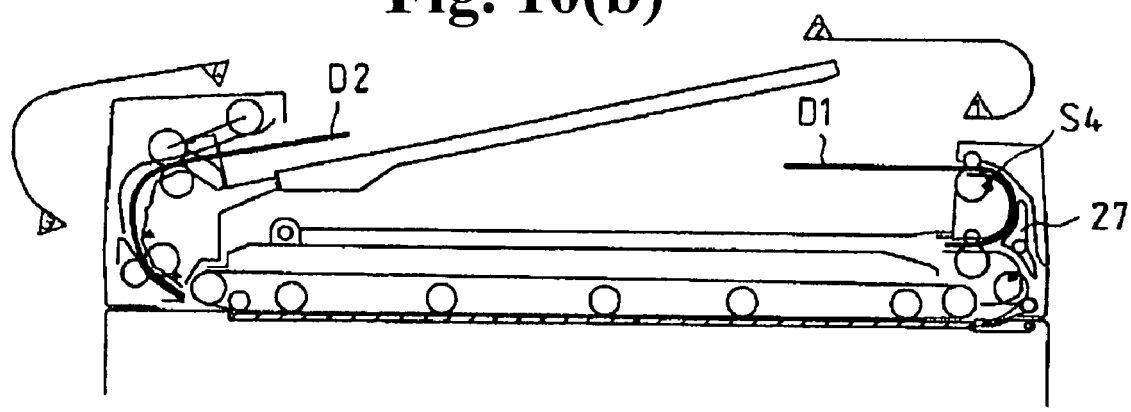
Figure 10C:
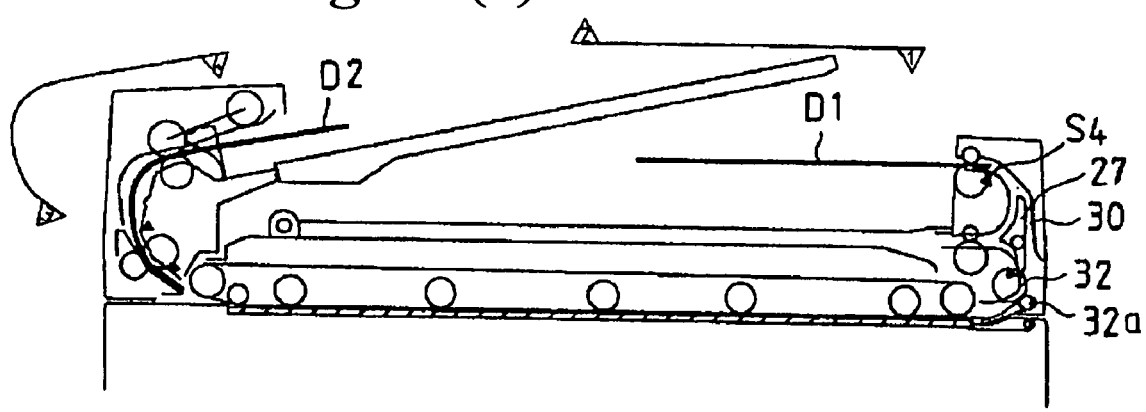

In the both-side reading mode, the procedure executed until the first document D1 is positioned at the set reference position P is similar to that of the one-side reading mode shown in FIGS. 6(a) and 6(b) (see FIGS. 9(a) and 9(b)).

Once a front side of the document D1 is read, the document D1 is guided to the switch back path using a procedure similar to that described above. At this time, the second document remains standing by at the position of the sensor S2 (see FIG. 9(c)). Then, the sensor S3 detects the trailing end of the document D1 passing through the gap 36. A specified time later (after the trailing end of the document D1 passes through the flexible film at the position P1), the switch back motor is driven to rotate in the reverse direction to convey the document D1 to the pair of sheet discharging rollers 22 and 22a along the switch back path (see FIGS. 10(a) and 10(b)). Subsequently, the sensor S4 detects the trailing end of the document D1. A specified time later (after the trailing end of the document D1 passes through the flexible film at the position P2), the switch back motor is driven to rotate in the reverse direction to rotate the discharging roller 22 in the reverse direction. The document D1 is guided to the sheet discharging path 30 via the flexible film and conveyed to the pair of scooping rollers 32 and 32a (see FIGS. 10(c) and 11(a)).

At this time, the switching flapper 27 is rotated so as to open the sheet discharging path 30. The scooping roller 32 is driven to rotate in the arrow direction b in FIG. 3 to smoothly guide the document D1 to the platen via the movable guide 41 and scooping guide 43 positioned as shown in FIG. 2(a).

When the document is switched back by the pair of sheet discharging rollers, the transporting belt motor drives the belt roller 15 to rotate in the reverse direction. The document D1 is moved on the platen toward the left edge of FIG. 3 so that the image side faces downwardly. Subsequently, when the document D1 is placed at the document set reference position P, the driving of the belt roller 15 is stopped (see FIG. 11(b)).

When the reading of the backside of the document D1 is finished, the transporting belt motor and the switch back motor are driven to rotate in the forward direction. Thus, in accordance with a reverse procedure compared to that described above, the document D1 is conveyed from the platen to the sheet discharging path 30 via the pair of scooping rollers 32 and the switching flapper 27, and is then discharged onto the sheet discharging tray 20 (see FIGS. 11(c) and 12(a)). In this case, the image side of the document D1, initially facing upwardly, faces downwardly during discharging.

Figure 12A:
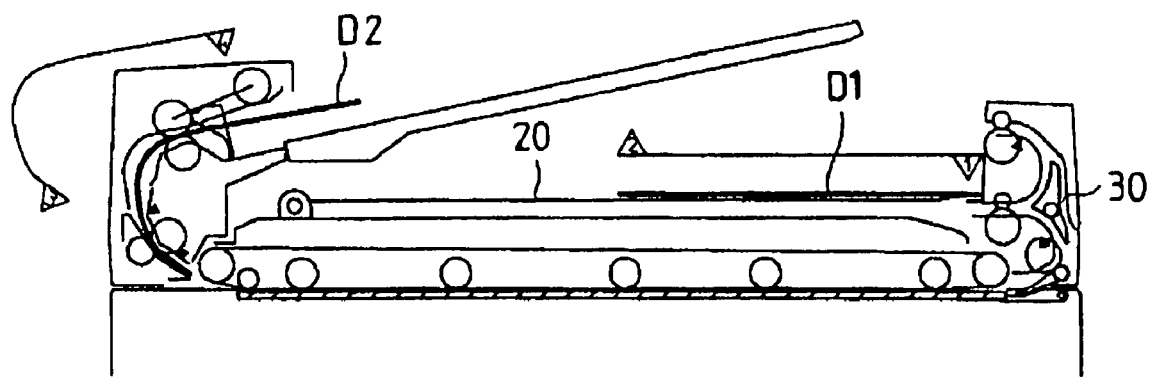
FIGS. 12(a) and 12(b) are views sequentially illustrating the both-side reading operation No. 4.
Figure 12B:
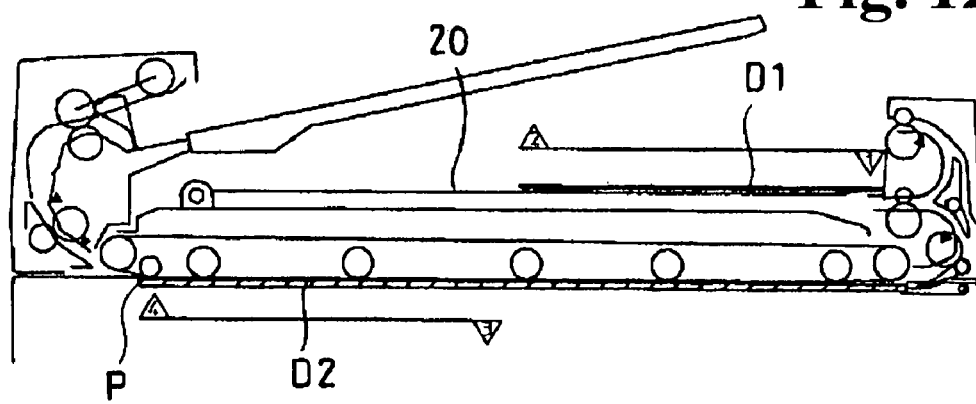

When the document D1 is discharged, the sheet feeding motor is driven to rotate in the reverse direction to place the document D2 standing by at the position of the sensor S2 at the document set reference position P, so that a front side of the document D2 is read (see FIG. 12(b)). Subsequently, the procedure shown in FIGS. 9(c) to 12(a) is repeated to read images on both sides of the succeeding documents D2, D3, . . . and then sequentially discharge them so that their front sides face downwardly. As a result, the documents are sequentially discharged onto the sheet discharging tray 20 so that their front sides face downwardly. Therefore, the documents are arranged in the original order.

In the both-side reading mode, it is possible to reduce the time required for reading an image in successively reading documents, while allowing the documents to be discharged in the original order. Furthermore, the pair of sheet discharging rollers 22 and 22a is utilized for the switch back operation, thereby reducing a size of the section for returning the document to the platen.

The one-side reading mode and both-side reading mode described above are only examples, and may be properly modified. For example, in the both-side reading mode, after the front side is read, the document may be guided to the sheet discharging path 30 and switched back by the pair of sheet discharging rollers 22 and 22a. The document may be turned upside down via the switch back path 25 and subsequently returned to the platen. In this case, the document is discharged again onto the sheet discharging tray 20 via the sheet discharging path 30 after the backside thereof is read.

Furthermore, proper variations may be made to the driving means for driving the sheet feeding section A, transporting section B, and switch back/sheet discharging section C as well as the transmission mechanisms for driving. The document transport apparatus may be installed on the image reading apparatus as a separate element or may be pre-incorporated into the image reading apparatus as a constituent member.

As described above, according to the embodiments of the present invention, in the one-side reading mode, the document is turned upside down and switched back after the image is read, and then turned upside down again. The document is then guided to the pair of sheet discharging rollers and subsequently discharged as it is. Consequently, the documents are discharged in the original order. Furthermore, in the both-side reading mode, the switch back path and the sheet discharging path branched from the switch back path are utilized to switch back the document using the pair of switch back rollers and the pair of sheet discharging rollers. Accordingly, the document can be returned to the platen with the backside thereof upwardly after one side thereof is read. In this case, the document is turned upside down via the sheet discharging path and discharged after the both sides thereof are read. The discharged documents are sequentially arranged so that the front sides thereof face downwardly, i.e. in the original order.

According to the document transport apparatus and the document transport method described above, not only the pair of switch back rollers and the pair of sheet discharging rollers are utilized to perform the switch back operation, but the sheet discharging path is branched from the switch back path. Thus, in the both-side reading mode, it is not necessary to provide such a large loop transporting path in the prior art for turning the document upside down and then returning the document to the platen. It is also possible to reduce the size of the rollers for scooping up the document conveyed from the platen, thereby reducing the size of the whole apparatus.

While the invention has been explained with reference to the specific embodiments of the invention, the explanation is illustrative and the invention is limited only by the appended claims.

What is claimed is:

1. A document transport apparatus for an image reading apparatus with a platen comprising:
    a sheet feeding tray, and a sheet discharging tray,
    sheet feeding means for drawing a document from the sheet feeding tray, said sheet feeding means being disposed at one side of the document transport apparatus,
    transport means, disposed adjacent to the sheet feeding means, for receiving the document from the sheet feeding means and transporting the document to a predetermined position on the platen of the image reading apparatus,
    sheet discharging means disposed adjacent to the transport means at a side opposite to the sheet feeding means and located at the other side of the document transport apparatus, said sheet discharging means discharging the document to the sheet discharging tray after the document is read at the platen,
    a switch back path disposed adjacent to the sheet discharging means and located between the transport means and the sheet discharging tray, said switch back path turning the document upside down, reversing a leading end and a trailing end of the document, and guiding the document to the sheet discharging means while turning the document upside down again,
    a sheet discharging path, disposed adjacent to the sheet discharging means, for turning the document upside down and guiding the document to the sheet discharging means without reversing the leading and trailing ends of the document,
    control means electrically connected to the transport means and the sheet discharging means, said control means controlling the transport means and the sheet discharging means such that the document after one side thereof has been read is transported to the switch back path, and the document is transported again from the switch back path to the predetermined position on the platen through the sheet discharging path,
    a guide member disposed at a discharge side of the platen, said guide member being positioned below the platen when the document is transported from the platen and above the platen when the document is transported to the platen, and
    switching means connected to the guide member for switching a position of the guide member according to a direction that the document is transported.

2. A document transport apparatus according to claim 1, wherein said sheet discharging means discharges the document to the sheet discharging tray located below the sheet feeding tray and above the platen.

3. A document transport apparatus according to claim 1, wherein said control means controls the transport means and the sheet discharging means such that the document is discharged to the sheet discharging tray via the sheet discharging path after the document is transported from the switch back path to the predetermined position on the platen through the sheet discharging path and after the document is read.

4. A document transport apparatus according to claim 1, wherein said switching means includes a torque limiter disposed on a driving shaft of a transporting roller.

5. A document transport apparatus according to claim 1, wherein said sheet discharging means includes a pair of sheet discharging rollers capable of rotating in forward and reverse directions for discharging the document to the sheet discharging tray or transporting the document to the platen, and said discharging path is located between the platen and the pair of sheet discharging rollers and branched from the switch back path.

6. An image reading apparatus comprising the document transport apparatus according to claim 1, the platen for placing the document, and reading means for reading the document placed on the platen.

7. An image reading apparatus according to claim 6, wherein said control means controls the transport means and the sheet discharging means such that the document is discharged to the sheet discharging tray via the sheet discharging path after the document is transported from the switch back path to the predetermined position on the platen through the sheet discharging path and after the document is read.

8. A document transport apparatus according to claim 1, wherein said switch back path includes a first portion extending to a portion adjacent to the transport means for receiving the document transferred by the transport means, a second portion extending toward the sheet discharge path, and a gap disposed between the first and second portions.

9. A document transport apparatus according to claim 8, wherein said sheet discharging path includes a U turn path connecting the first and second portions without passing the gap.

10. A document transport method comprising:
drawing a document from a sheet feeding tray in a condition such that one edge of the document becomes a leading edge,
transporting the document directly to a predetermined position on a platen in a condition such that said one edge of the document is said leading edge,
guiding the document after one side thereof is read to a switch back path, said switch back path turning the document upside down, and reversing a leading end and a trailing end of the document,
transporting the document from the switch back path toward a sheet discharging tray,
changing a transporting direction of the document before the document is completely discharged to the sheet discharging tray,
guiding the document that the transporting direction is changed to a U turn path to transport the document to the predetermined position on the platen again,
transporting the document to the U turn path after the other side of the document is read, and
discharging the document to the sheet discharging tray.

11. A document transport method according to claim 10, wherein said switch back path includes a gap so that the document sent into the gap in one direction is sent out in a direction opposite to said one direction.

* * * * *